(12) United States Patent
Okuda et al.

(10) Patent No.: US 10,069,122 B2
(45) Date of Patent: Sep. 4, 2018

(54) POWER STORAGE MODULE

(71) Applicant: KABUSHIKI KAISHA TOYOTA JIDOSHOKKI, Kariya, Aichi (JP)

(72) Inventors: Motoaki Okuda, Kariya (JP); Hiroyasu Nishihara, Kariya (JP); Kojiro Tamaru, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/033,818

(22) PCT Filed: Jun. 10, 2014

(86) PCT No.: PCT/JP2014/065372
§ 371 (c)(1),
(2) Date: May 2, 2016

(87) PCT Pub. No.: WO2015/068421
PCT Pub. Date: May 14, 2015

(65) Prior Publication Data
US 2016/0285060 A1    Sep. 29, 2016

(30) Foreign Application Priority Data
Nov. 8, 2013 (JP) ................. 2013-232090

(51) Int. Cl.
*H01M 2/00* (2006.01)
*H01M 2/10* (2006.01)
*H01M 2/02* (2006.01)

(52) U.S. Cl.
CPC ....... *H01M 2/1077* (2013.01); *H01M 2/0217* (2013.01); *H01M 2/1061* (2013.01); *H01M 2/02* (2013.01); *H01M 2/0245* (2013.01)

(58) Field of Classification Search
CPC .................................................. H01M 2/0245
See application file for complete search history.

(56) References Cited

U.S. PATENT DOCUMENTS 5,756,227 A * 5/1998 Suzuki ...................... F28F 3/02
429/120
6,929,880 B1   8/2005 Mori et al.
(Continued)

FOREIGN PATENT DOCUMENTS

CN    1194429 C    3/2005
CN    1862866 A    11/2006
(Continued)

OTHER PUBLICATIONS

Communication dated Jun. 21, 2016, issued by the Korean Intellectual Property Office in corresponding Korean Application No. 10-2016-7012070.
(Continued)

*Primary Examiner* — Jeremiah R Smith
(74) *Attorney, Agent, or Firm* — Sughrue Mion, PLLC

(57) ABSTRACT

A power storage module in which rectangular power storage devices each having an electrode assembly and an electrolyte accommodated in a case are configured to be connected, wherein the power storage devices are arrayed in a predetermined array direction (a direction in which positive electrodes and negative electrodes are stacked) and bonded in an arrayed state, and thicknesses of surfaces (in particular, at least parts in contact with an adjacent member in the surfaces of the bonded sides) on bonded sides of the cases are less than thicknesses of surfaces of non-bonded sides.

2 Claims, 3 Drawing Sheets

(56) References Cited

U.S. PATENT DOCUMENTS

| | | | | |
|---|---|---|---|---|
| 7,625,665 | B2* | 12/2009 | Jeon | F28D 9/0081 429/157 |
| 2006/0115719 | A1* | 6/2006 | Jeon | F28D 9/0081 429/156 |
| 2006/0269842 | A1 | 11/2006 | Ichinose et al. | |
| 2010/0143785 | A1* | 6/2010 | Kwag | H01M 2/18 429/156 |
| 2010/0209769 | A1* | 8/2010 | Hamada | H01M 2/0242 429/185 |
| 2011/0206977 | A1* | 8/2011 | Ikeda | H01M 2/0257 429/156 |
| 2013/0065103 | A1* | 3/2013 | Yumura | E02F 9/0858 429/120 |
| 2013/0316210 | A1* | 11/2013 | Morita | H01M 2/024 429/94 |

FOREIGN PATENT DOCUMENTS

| | | | | |
|---|---|---|---|---|
| JP | 08-148187 | A | | 6/1996 |
| JP | 2002-050322 | A | | 2/2002 |
| JP | 2002-279941 | | * 9/2002 | ............ H01M 2/02 |
| JP | 2002-279941 | A | | 9/2002 |
| JP | 2003-208877 | A | | 7/2003 |
| JP | 2010040181 | A | | 2/2010 |
| JP | 2010-113966 | A | | 5/2010 |
| JP | 2012-230963 | A | | 11/2012 |
| KR | 10-2002-0042527 | A | | 6/2002 |
| KR | 1020040110254 | A | | 12/2004 |

OTHER PUBLICATIONS

International Search Report for PCT/JP2014/065372 dated Jul. 29, 2014.
Written Opinion for PCT/JP2014/065372 dated Jul. 29, 2014.
International Preliminary Report on Patentability dated May 19, 2016 in counterpart application No. PCT/JP2014/065372.
Communication dated May 24, 2017 from the State Intellectual Property Office of the P.R.C. in counterpart application No. 201480058867.0.

* cited by examiner

PRIOR ART

POWER STORAGE MODULE

CROSS REFERENCE TO RELATED APPLICATIONS

This application is a National Stage of International Application No. PCT/JP2014/065372 filed Jun. 10, 2014, claiming priority based on Japanese Patent Application No. 2013-232090 filed Nov. 8, 2013, the contents of all of which are incorporated herein by reference in their entirety.

TECHNICAL FIELD

The present invention relates to a power storage module.

BACKGROUND ART

A power storage device is configured by accommodating an electrode assembly in which a positive electrode and a negative electrode are stacked via a separator and an electrolyte in a case. In FIG. 3, an example (planar cross-sectional view) of such a power storage device 100 in which an electrode assembly 100b is accommodated in contact with a rectangular case 100a and the case 100a is filled with an electrolyte 100c is illustrated. The power storage module is bonded between end plates in a state in which a plurality of power storage devices configured as described above are arrayed in a predetermined array direction. For example, in Patent Literature 1, a battery assembly in which a plurality of unit batteries between which heat transfer plates are interposed are arrayed in a row and holding plates arranged at both sides of the plurality of unit batteries are fastened by bolts across straightedge rods is disclosed.

CITATION LIST

Patent Literature

[Patent Literature 1] Japanese Unexamined Patent Publication No. H8-148187

SUMMARY OF INVENTION

Technical Problem

In either of a power storage device used alone and a power storage device incorporated into a power storage module, a gas may be generated due to a degradation reaction (for example, a decomposition reaction of the electrolytic solution) when the power storage device is used for a long period. When a gas is generated in the case, a pressure in the case becomes high. A bulge is generated in the case due to the high internal pressure and is likely to deform the case. To secure pressure-resistance strength of the case necessary to prevent such deformation, it is necessary to increase the thickness of each surface of the case. In particular, when a cross-sectional shape is rectangular as in the rectangular power storage device 100 illustrated in FIG. 3, an amount of deformation of surfaces 100d on long sides of the case 100a increases. Thus, it is necessary to design the thickness of the case so that the surfaces on the long sides are not deformed and the thicknesses of the surfaces on the long sides and the thicknesses of other surfaces increase. However, as the thickness of each surface of the case increases, a volume of a space portion in the case decreases. When the volume in the case decreases, the thickness or volume of the electrode assembly securable in the case decreases and an amount of an active material of each of a positive electrode and a negative electrode of the electrode assembly decreases. Thus, the capacity of each of the positive electrode and the negative electrode decreases and a volume energy density of the power storage device (and the power storage module) decreases.

Thus, in this technical field, there is a need for a power storage module capable of suppressing the deformation of a case of a power storage device and improving a volume energy density.

Solution to Problem

A power storage module according to an aspect of the present invention is a power storage module in which a plurality of rectangular power storage devices each having an electrode assembly and an electrolyte accommodated in a case are configured to be connected, wherein the plurality of power storage devices are arrayed in a predetermined array direction and bonded in an arrayed state, and wherein thicknesses of surfaces on bonded sides of the cases are less than thicknesses of surfaces on non-bonded sides of the cases.

In this power storage module, a plurality of power storage devices are arrayed in a predetermined direction and bonded in the arrayed state. Each power storage device is rectangular and the electrode assemblies and the electrolyte are accommodated in the rectangular cases. Because the plurality of rectangular power storage devices are bonded, there are surfaces on bonded sides (surfaces on sides in contact with an adjacent member that receive a bonding load) and surfaces on non-bonded sides among the side surfaces of the rectangular cases. Because the surfaces on the bonded sides of the cases receive the bonding load from both sides even when the thicknesses are small, the pressure-resistance strength is higher than that of the surfaces on the non-bonded sides and the deformation under the pressure does not easily occur. Therefore, in the power storage module, there are cases in which the thicknesses of the surfaces on the bonded sides are less than the thicknesses of the surfaces on the non-bonded sides. Because the thicknesses of the surfaces on the bonded sides of the cases are small, the volumes of the space portions in the cases can increase according to the thinned thicknesses. Accordingly, it is possible to increase an amount of an active material of each of the positive electrodes and the negative electrodes by increasing the thicknesses and the volumes of the electrode assemblies. As a result, an amount of the active material of each of the positive electrodes and the negative electrodes increases and the volume energy density of the power storage devices (and the power storage module) increases. Thus, it is possible to suppress the deformation of the cases and improve the volume energy density by making the thicknesses of the surfaces on the bonded sides of the cases in the plurality of power storage devices bonded in the power storage module less than the thicknesses of the surfaces on the non-bonded sides.

In a type of power storage module, thicknesses of parts in contact with an adjacent member in the surfaces on the bonded sides are at least less than the surfaces on the non-bonded sides. It is possible to receive a bonding load at the parts in contact with the adjacent member even in the surfaces on the bonded sides of the cases and apply the bonding load to the electrode assemblies. Therefore, the thicknesses of the parts in contact with the adjacent member are set to be at least less than the thicknesses of the surfaces on the non-bonded sides. Also, the adjacent member, for example, is the cases of the power storage devices when there is no intervening member between the power storage devices and is a heat transfer member, a heat radiation member, or the like serving as an intervening member when there is an intervening member between the power storage devices.

In a type of power storage module, parts in contact with the adjacent member include contact surfaces of the electrode assemblies with the cases. The bonding load is applied by bonding the plurality of power storage devices to make reactions between the positive electrodes and negative electrodes included in the electrode assemblies uniform. Therefore, when the parts in contact with the adjacent member in the surface on the bonded sides of the cases do not include contact surfaces of the electrode assemblies with the cases, the bonding load is not applied to the entire surfaces on a stack direction side in the electrode assemblies and the reactions between the positive electrodes and the negative electrodes stacked in the electrode assembly are not uniform.

Advantageous Effects of Invention

According to the present invention, it is possible to suppress the deformation of cases of power storage devices and improve a volume energy density.

DESCRIPTION OF EMBODIMENTS

Figure 1:
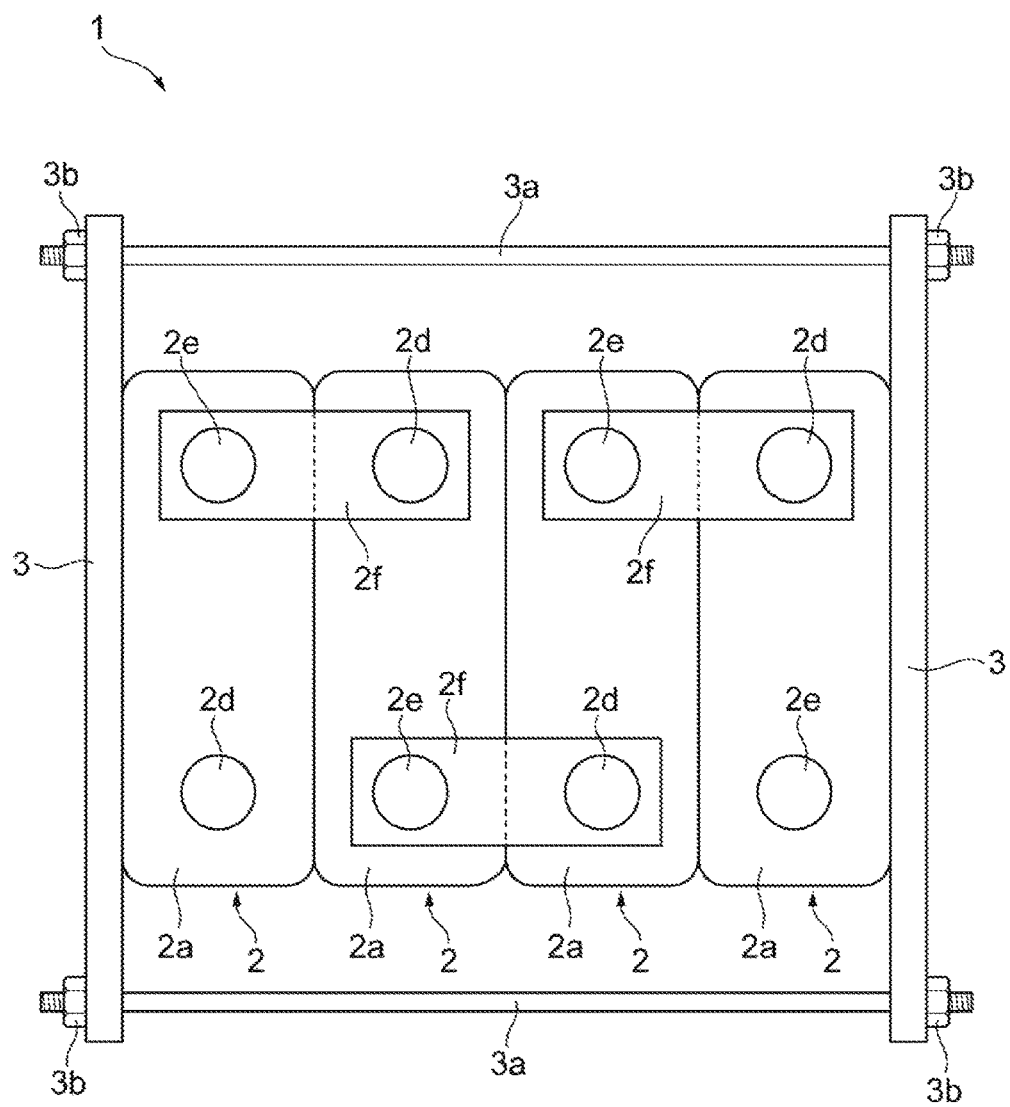
FIG. 1 is a plan view schematically illustrating a power storage module according to this embodiment.

Hereinafter, embodiments of a power storage module according to the present invention will be described with reference to the drawings. Also, the same or like elements in the drawings are assigned the same reference signs and redundant description thereof will be omitted.

In this embodiment, the power storage module according to the present invention is applied to a power storage module bonded in a state in which a plurality of power storage devices are arrayed in a predetermined array direction between end plates. Also, although a type of power storage module in which there are no members interposed between the power storage devices is provided in this embodiment, a power storage module in which there are members interposed between power storage devices may be provided.

Figure 2:
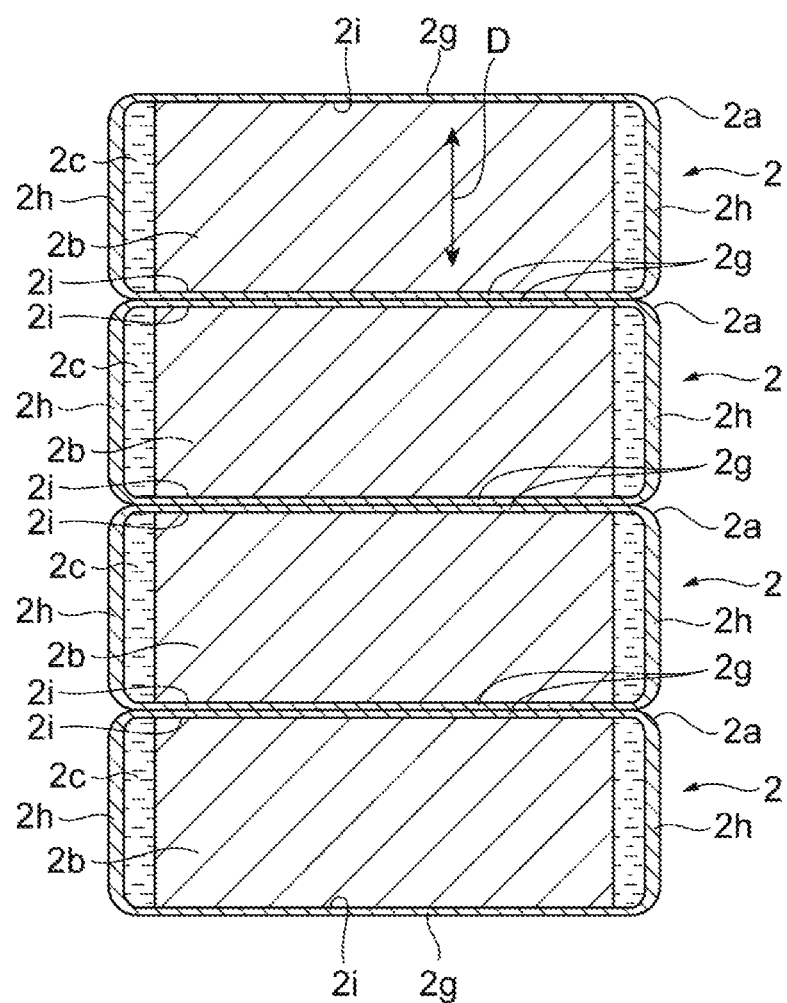
FIG. 2 is a planar cross-sectional view schematically illustrating planar cross sections of a plurality of power storage devices in a bonded state in the power storage module of FIG. 1.
Figure 3:
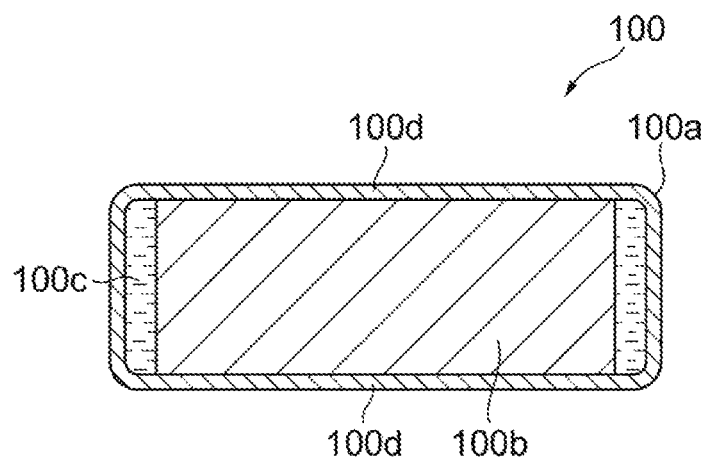
FIG. 3 is a planar cross-sectional view schematically illustrating the cross section of a power storage device.

A power storage module 1 according to this embodiment will be described with reference to FIGS. 1 and 2. FIG. 1 is a plan view schematically illustrating a power storage module 1 according to this embodiment. FIG. 2 is a planar cross-sectional view schematically illustrating planar cross sections of a plurality of power storage devices in a bonded state in the power storage module 1 of FIG. 1.

The power storage module 1 is configured in a state in which a plurality of power storage devices 2 are arrayed and the array is bonded between a pair of end plates 3 and 3 arranged at both end surfaces in an array direction. Also, the configuration of the power storage module 1 described here is an example and power storage modules of various other configurations can be applied.

The power storage devices 2 are rectangular power storage devices. The plurality of power storage devices 2 are bonded by applying bonding pressure (a bonding load) by sandwiching the plurality of power storage devices 2 between the end plates 3 and 3 in an arrayed state in a predetermined array direction. This array direction is a direction in which positive electrodes and negative electrodes are stacked and is a direction in which surfaces on long sides between the adjacent rectangular power storage devices 2 and 2 are in contact. Here, the configuration of the power storage devices 2 (in particular, a lithium-ion secondary battery) will be described. The long sides are sides which are longer among sides of the rectangular shapes (including four arcuate (rounded) corners) in the planar cross section illustrated in FIG. 2. Also, the configuration of the power storage devices 2 to be described below is an example and power storage devices of various other configurations can be applied.

Each of the power storage devices 2 mainly includes a case 2a, an electrode assembly 2b, and an electrolyte 2c. The case 2a is a case configured to accommodate the electrode assembly 2b and the electrolyte 2c and is rectangular. The case 2a is, for example, formed of a metal such as aluminum or stainless steel. The thickness of each surface of the case 2a will be described in detail later.

The electrode assembly 2b includes a positive electrode, a negative electrode, and a separator for insulating the positive electrode and the negative electrode. The electrode assembly 2b is configured by stacking a plurality of positive electrodes and a plurality of negative electrodes having sheet shapes and a plurality of separators having sheet shapes (or bag shapes). The stack direction D is the above-described array direction. The electrode assembly 2b is accommodated in the case 2a and the case 2a is filled with the electrolyte 2c.

The positive electrode is formed of a metal foil and a positive electrode active material formed on at least one surface of the metal foil. The positive electrode has a tab on which no positive electrode active material layer is formed at an end of the metal foil. The tab extends to an upper edge part and is connected to a positive electrode terminal 2d via a conductive member. The metal foil is, for example, an aluminum foil or an aluminum alloy foil. The positive electrode active material layer includes a positive electrode active material and a binder. The positive electrode active material layer may include a conductive agent. The positive electrode active material is, for example, a composite oxide, metal lithium, or sulfur. The composite oxide includes at least one of manganese, nickel, cobalt and aluminum, as well as lithium. The binder is, for example, a thermoplastic resin such as a polyimide, a polyamide-imide or a polymer resin having main chain imide bonds. The conductive agent is, for example, carbon black, graphite, acetylene black, or Ketjenblack (registered trademark).

The negative electrode is made of a metal foil and a negative electrode active material layer formed on at least one surface of the metal foil. The negative electrode has a tab on which no negative electrode active material layer is formed at an end of the metal foil. The tab extends to an upper edge portion of the negative electrode and is connected to a negative electrode terminal 2e via a conductive member. The metal foil is, for example, a copper foil or a copper alloy foil. The negative electrode active material layer may include a negative electrode active material and a binder. The negative electrode active material layer may include a conductive agent. The negative electrode active material is, for example, carbon such as graphite, highly oriented graphite, meso carbon micro beads, hard carbon, or soft carbon, an alkali metal such as lithium or sodium, a metal compound, a metal oxide such as $SiO_x$ ($0.5 \leq x \leq 1.5$), or boron-doped carbon. For the binder and the conductive agent, the binder and the conductive agent as shown in the positive electrode can be applied.

The separator isolates the positive electrode and the negative electrode and causes lithium ions to pass while preventing the short circuiting of a current by contact of both ends. The separator is, for example, a porous film made of a polyolefin resin such as polyethylene (PE) or polypropylene (PP) or a woven or nonwoven fabric made of polypropylene, polyethylene terephthalate (PET), methylcellulose, or the like.

When the plurality of power storage devices 2 are arrayed in the above-described array direction, positions of the positive electrode terminals 2d and the negative electrode terminals 2e are arrayed to alternate between the adjacent power storage devices 2 and 2. The positive electrode terminals 2d and the negative electrode terminals 2e are connected by connection members 2f between the adjacent power storage devices 2 and 2 and the plurality of power storage devices 2 are electrically connected in series.

The electrolyte 2c is accommodated in the cases 2a and impregnated within the electrode assemblies 2b. The electrolyte 2c is, for example, an organic-solvent-based or non-aqueous electrolyte.

The end plates 3 are arranged at both ends of the plurality of power storage devices 2 arrayed in the above-described array direction and are members for bonding the plurality of power storage devices 2 by applying bonding pressure (a bonding load) to the plurality of arrayed power storage devices 2 (the surfaces 2g on the long sides of the rectangular cases 2a) from both sides. The end plates 3 are tabular and the surfaces in contact with the surfaces 2g on the long sides of the cases 2a are surfaces that are sufficiently larger than the surfaces in the above-described array direction in the power storage devices 2. The end plates 3 are thick enough that the bonding pressure can be applied. A plurality of through holes (not illustrated) having diameters in which coupling members 3a can be inserted are opened in the end plates 3. The positions of the through holes are, for example, at the periphery of corner portions of four corners of the end plates 3. The coupling members 3a are rod-shaped members and are formed with male threads at both ends. When the plurality of power storage devices 2 are sandwiched between the end plates 3 and 3, the coupling members 3a pass through the through holes of each of the end plates 3 and 3 at both sides and nuts 3b and 3b are screwed onto the male threads at both ends of the coupling members 3a. Thereby, the bonding pressure is applied to the plurality of power storage devices 2 between the end plates 3 and 3 and the plurality of power storage devices 2 are in the bonded state. At this time, the surfaces 2g on the long sides among the side surfaces of the cases 2a receive a bonding load and surfaces 2h on the short sides among the side surfaces do not receive the bonding load.

Also, the plurality of arrayed power storage devices 2 are bonded to make the reactions between the positive electrodes and the negative electrodes within the electrode assemblies 2b uniform by applying the bonding load to the surfaces 2g on the long sides of the cases 2a (and both sides of the electrode assemblies 2b). Contact parts of the surfaces 2g and 2g of the long sides between the cases 2a and 2a of the adjacent power storage devices 2 and 2 receive the bonding load. The contact parts are approximately the entire surfaces 2g of the long sides of the cases 2a as can be seen from FIG. 2. In addition, the contact parts are larger than contact surfaces 2i of the electrode assemblies 2b with the cases 2a and fully include the contact surfaces 2i. The contact surfaces 2i of the electrode assemblies 2b are surfaces on the sides in the stack direction D of the positive electrodes and the negative electrodes. Therefore, the bonding load received at the contact parts in the surfaces 2g and 2g on the long sides of the cases 2a can be applied to the entire contact surfaces 2i of the sides of the stack direction D in the electrode assemblies 2b. Because the entire contact surfaces 2i and 2i on both sides in the stack direction D receive the bonding load in the electrode assemblies 2b, the positive electrodes and the negative electrodes react uniformly.

The thickness of each surface of the cases 2a will be described. Each surface 2g on the long sides of the cases 2a receives the bonding load from both sides in the array direction. Thus, the surfaces 2g on the long sides have larger pressure-resistance strength than the surfaces 2h on the short sides which do not receive the bonding load. Therefore, the surfaces 2g on the long sides among the side surfaces of the cases 2a are set to be thinner than the surfaces 2h on the short sides. The thicknesses of the surfaces 2h on the short sides are about the same as the thicknesses of cases of power storage devices of a conventional power storage module. Therefore, the surfaces 2g on the long sides are thinner than cases of power storage devices of a conventional power storage module. An extent to which the thicknesses of the surfaces 2g on the long sides are less than the thicknesses of the surfaces 2h on the short sides is designed in consideration of sizes (areas) and shapes (aspect ratios or the like) of the surfaces 2g on the long sides, a ratio between sizes of the surfaces 2h on the short sides and sizes of the surfaces 2g on the long sides, the quality of a material of the cases 2a, a maximum pressure in the cases 2a, etc. Also, thicknesses of other surfaces (the bottom surfaces or the like) of the cases 2a need only be about the same as the thicknesses of the surfaces 2h on the short sides.

Thus, when external shapes of the cases 2a are the same as external shapes of cases of power storage devices of a conventional power storage module because the thicknesses of the surfaces 2g on the long sides are set to thicknesses less than those of the surfaces 2h on the short sides, the volumes of the space portions in the cases 2a increase according to the thinned thicknesses. The volumes of the electrode assemblies 2b are increased by increasing the thickness of the electrode assemblies 2b in stack direction D and an amount of each active material of the positive electrodes and the negative electrodes increases. As a result, the capacity of each of the positive electrodes and the negative electrodes increases and the volume energy density of the power storage devices 2 (and the power storage module 1) increases.

Also, a gas may be generated in the cases 2a according to a degradation reaction (for example, a decomposition reaction of the electrolyte 2c) or the like when the power storage devices 2 (the power storage module 1) are used for a long time. When the gas is generated in the cases 2a, the pressure in the cases 2a increases. Because the thickness of each surface on the long sides of the case 2a is small, but the surfaces 2g receive the bonding load from both sides and are bonded, the pressure-resistance strength increases. Thus, it is possible to suppress (prevent) the cases 2a from expanding and suppress the deformation of the cases 2a even when the pressure in the cases 2a increases. In particular, the surfaces on the long sides of the rectangular cases 2a tend to be deformed, but this deformation can be suppressed. The pressure-resistance strength is high because each surface $2h$ of the short sides of the cases $2a$ is thick.

According to this power storage module 1, it is possible to suppress the deformation of the cases $2a$ and improve the volume energy density by making the thicknesses of the surfaces $2g$ on the bonded sides among the side surfaces of each case $2a$ in a plurality of power storage devices 2 which are bonded less than the thicknesses of the surfaces $2h$ of the non-bonded sides. In particular, because the surfaces on the bonded sides of the cases $2a$ are the surfaces $2g$ on the long sides and the surfaces $2g$ on the long sides are thin in the power storage module 1, it is possible to increase the thickness and the volume of the electrode assemblies $2b$ (and an amount of each of active materials of the positive electrodes and the negative electrodes) more and the improvement effect of the volume energy density is high. Also, the improvement effect of the volume energy density increases more when the surfaces $2g$ on the bonded sides of the cases $2a$ are greater than the surfaces $2h$ on the non-bonded sides.

Also, because the surfaces $2g$ on the long sides at sides in contact with the electrode assemblies $2b$ of the cases $2a$ are set to be thin even when there is undulation (unevenness) in the surfaces $2g$ on the long sides of the cases $2a$ receiving the bonding load and the contact surfaces $2i$ of the electrode assemblies $2b$ according to this power storage module 1, the follow-up performance in which the load is transferred is high and the bonding load can be applied to the electrode assemblies $2b$.

Although the embodiments according to the present invention have been described above, the present invention is not limited to the above-described embodiments but can be practiced in various forms.

For example, although adjacent power storage devices within the power storage module are configured to be directly in contact with each other in this embodiment, the present invention can also be applied to a configuration in which an intervening member such as a heat transfer member or a heat radiation member is interposed between adjacent power storage devices.

Also, although a plurality of power storage devices are configured to be electrically connected in series within a power storage module in this embodiment, the present invention can also be applied when a plurality of power storage devices are connected in parallel or when the plurality of power storage devices are connected in parallel and in series.

Also, although the present invention is applied to a power storage device in which the surfaces on the bonded sides are surfaces on long sides among side surfaces of a rectangular case in this embodiment, the present invention can also be applied to a power storage device in which the surfaces on the bonded sides are surface on short sides and a power storage device in which the surfaces on the bonded sides and the surfaces on the non-bonded sides have the same side length.

Also, although the entire surfaces on the bonded sides of the cases are in contact with adjacent members (cases or the like of the power storage devices) and the thicknesses of the entire surfaces on the bonded sides of the cases are configured to be less than the thicknesses of the surfaces on the non-bonded sides in this embodiment, only at least parts in contact with adjacent members in surfaces on the bonded sides may be configured to be thin when there are parts that are not in contact with the adjacent members in surfaces on the bonded sides.

REFERENCE SIGNS LIST

1 Power storage module; 2 Power storage device; $2a$ Case; $2b$ Electrode assembly; $2c$ Electrolyte; $2d$ Positive electrode terminal; $2e$ Negative electrode terminal; $2f$ Connection member; $2g$ Surface on long side; $2h$ Surface on short side; $2i$ Contact surface; 3 End plate; $3a$ Coupling member; $3b$ Nut.

The invention claimed is:

1. A power storage module, comprising:
a plurality of rectangular power storage devices arrayed in a stack direction, and
a pair of end plates arranged at opposing ends of the plurality of rectangular power storage devices,
wherein each of the plurality of rectangular power storage devices includes an electrode assembly and an electrolytic fluid accommodated in a case, the electrode assembly includes positive electrodes and negative electrodes having sheet shapes and stacked in the stack direction,
wherein a thickness of bonded sides of the case is less than a thickness of non-bonded sides of the case,
the electrode assembly is disposed within the case so that the electrode assembly does not contact the non-bonded sides of the case, and
the electrode assembly is disposed within the case so that the electrode assembly contacts a contact surface on an inner side of the bonded sides of the case, and the end plates are bonded to the cases at the opposing ends of the plurality of rectangular power storage devices wherein an area of the end plates is larger than an area of the bonded sides of the case, so that a bonding load is applied in the stack direction to the entire contact surface of the bonded sides.

2. The power storage module according to claim 1, further comprising an intervening member bonded between adjacent ones of the plurality of rectangular power storage devices, and the intervening member is bonded to the case so that the bonding load is applied in the stack direction to the entire contact surface of the bonded sides.

* * * * *